(12) United States Patent
Rusovici

(10) Patent No.: US 9,394,804 B2
(45) Date of Patent: Jul. 19, 2016

(54) APPARATUS AND METHOD FOR ROTATING FLUID CONTROLLING VANES IN SMALL TURBINE ENGINES AND OTHER APPLICATIONS

(71) Applicant: Razvan Rusovici, Rockledge, FL (US)

(72) Inventor: Razvan Rusovici, Rockledge, FL (US)

(73) Assignee: Florida Institute of Technology, Melbourne, FL (US)

(*) Notice: Subject to any disclaimer, the term of this patent is extended or adjusted under 35 U.S.C. 154(b) by 822 days.

(21) Appl. No.: 13/749,637

(22) Filed: Jan. 24, 2013

(65) Prior Publication Data

US 2014/0286745 A1    Sep. 25, 2014

Related U.S. Application Data

(60) Provisional application No. 61/590,092, filed on Jan. 24, 2012.

(51) Int. Cl.
F01D 17/16    (2006.01)

(52) U.S. Cl.
CPC ............ *F01D 17/162* (2013.01); *Y02T 50/672* (2013.01)

(58) Field of Classification Search
None
See application file for complete search history.

(56) References Cited

U.S. PATENT DOCUMENTS

| | | | |
|---|---|---|---|
| 3,628,329 A | | 12/1971 | Spencer |
| 3,861,822 A | | 1/1975 | Wanger |
| 3,990,809 A | * | 11/1976 | Young et al. ............ 415/160 |
| 4,546,606 A | * | 10/1985 | Bouiller et al. ............ 60/262 |
| 4,668,165 A | * | 5/1987 | Ludwick ............ 415/148 |
| 4,950,129 A | | 8/1990 | Patel et al. |
| 5,141,391 A | | 8/1992 | Acton et al. |
| 5,332,942 A | | 7/1994 | Rennex |
| 5,601,401 A | * | 2/1997 | Matheny et al. ............ 415/160 |
| 5,887,828 A | * | 3/1999 | Appa ............ 244/215 |
| 7,096,657 B2 | | 8/2006 | Mahoney et al. |
| 7,251,925 B2 | | 8/2007 | Paradise |
| 7,632,064 B2 | | 12/2009 | Somanath et al. |
| 7,721,549 B2 | | 5/2010 | Baran |

(Continued)

FOREIGN PATENT DOCUMENTS

EP          2551469         1/2013
WO    WO 2013102098 A1 *  7/2013

OTHER PUBLICATIONS

Bardone, Marchetti, Trovati, Actuation system for variable exhaust nozzle and inlet guide vanes on an advanced gar turbine engine, RTO AVT Symposium, Toulouse, France, May 11-15, 1998.

(Continued)

*Primary Examiner* — Ninh H Nguyen
*Assistant Examiner* — Justin Seabe
(74) *Attorney, Agent, or Firm* — Stephen C. Thomas

(57) ABSTRACT

Actuation systems and methods for varying the angle of small turbine engine inlet guide vanes (IGV) and/or compressor stator vanes (CSV). Such systems and methods may employ a piezoelectric inchworm actuator (or a piezo stack actuator or magnetostrictive actuator, depending upon actuation requirements) to actively modify the angle of attack of a single or a cascade of inlet guide vanes or compressor stator vanes. The change in angle of attack is necessary due to large variations in engine operating envelope including but not limited to air density, velocity, temperature, and the like. The present invention is especially suitable to actuate small inlet guide vanes and compressor stator vanes found in small turbine jet engines including but not limited to those under ten (10) inches in diameter.

20 Claims, 11 Drawing Sheets

(56) References Cited

U.S. PATENT DOCUMENTS

| | | | |
|---|---|---|---|
| 7,922,445 B1 | 4/2011 | Pankey et al. | |
| 7,927,067 B2* | 4/2011 | Rajamani et al. | 415/118 |
| 8,276,362 B2 | 10/2012 | Suciu et al. | |
| 8,297,918 B2 | 10/2012 | Bhatnagar | |
| 8,794,910 B2* | 8/2014 | Gasmen et al. | 415/160 |
| 2009/0297334 A1 | 12/2009 | Norris et al. | |
| 2010/0000220 A1 | 1/2010 | Chaudhry | |

OTHER PUBLICATIONS

Uchida, Kashimoto, Iwakiri, Development of wide flow range compressor with variable inlet guide vane, R7D Review of Toyota CRDL, vol. 41, No. 3, Jun. 26, 2006.

Kurz, Gas Turbine Performance, Proceedings of the 34th Turbomachinery Symposium, San Diego, California, Sep. 2005.

Iwakiri, Uchida, Numerical fluid analysis of a variable geometry compressor for use in a turbocharger, R7D Review of Toyota CRDL, vol. 41, No. 3, Jun. 21, 2006.

Wirkowski, Influence of the Incorrect Settings of Axial Compressor Inlet Variable Stator Vanes on Gas Turbine Engine Work Parameters, Journal of KONES Power-train and Transport, vol. 19, No. 3, 2012.

Rolls-Royce, RB211 closed loop VIGV control upgrade, Produced by Customer Information Centre, 2004 Rolls-Royce plc.

Rusovici, Choon, Sepri, Feys, Smart Actuation of Inlet Guide Vanes for Small Turbine Engine, Conference, Apr. 15, 2011.

Barr, Journal of Aviation and Aerospace Perspectives, Winter 2011-vol. 1, No. 2.

Pampreen, The use of Variable Inlet Guide Vanes for Automotive Gas Turbine Engine Augmentation and Load Control, Society of Automotive Engineers, Detroit Michigan, Feb. 23-27, 1976.

Cappelleri, Frecker, Simpson, Optimal design of a PZT Bimorph Actuator for Minimally Invasive Surgery, Pennsylvania State University.

Waechter, Salisbury, Mrad, Prasad, Blacow, Yan, Complementary Inchworm actuator for high-force high precision applications, Department of Mechanical and Industrial Engineering, University of Toronto, Date unknown.

Salisbury, Waechter, Mrad, Prasad, Blacow, Yan, Design considerations for complementary inchworm actuators, Jun. 2006.

Merry, Kleijn, Molengraft, Steinbuch, Control of a high precision stage using a walking piezo actuator, 16th IEEE International Conference on Control Applications, Singapore, Oct. 1-3, 2007.

Inchworm Motor Technology, Inchworm Motors Assure Precise Positioning, www.expo.com, Sep. 2003.

Merry, Kleijn, Molengraft, Steinbuch, Using a walking Piezo Actuator to Drive and Control a High-Precision Stage, IEEE/ASME Transactions on Mechatronics, vol. 14, No. Feb. 1, 2009.

Uchino, Introduction to Piezoelectric Actuators and Transducers, Center for Actuators and Transducers, Penn State University.

Novotny, Ronkanen, Piezoelectric Actuators, Article, Date unknown.

Niezrecki, Brei, Balakrishnan, Moskalik, Piezoelectric Actuation: State of the Art, The Shock and Vibration Digest, 2001; 33; 269.

Rusovici, Choon, Sepn, Feys, Smart Actuation on Inlet Guide Vanes for Small Turbine Engine, Sensors and Smart Structures Technologies for Civil Mechanical and Aerospace Systems 2011, Apr. 15, 2011.

* cited by examiner

APPARATUS AND METHOD FOR ROTATING FLUID CONTROLLING VANES IN SMALL TURBINE ENGINES AND OTHER APPLICATIONS

CROSS REFERENCE TO RELATED APPLICATIONS

This application claims the benefit of U.S. Provisional Patent Application 61/590,092, which was filed on Jan. 24, 2012 and which is herein incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to the field of mechanical apparatus' usable for rotating fluid controlling vanes, such as those used in turbine engines. More specifically, the present invention relates to a novel apparatus which utilizes piezoelectric, piezo stack, piezoceramic, magnetostrictive or other reduced size actuators to rotate one or more vanes, such as for example compressor stator vanes and/or inlet guide vanes in small turbine engines. The use of piezoelectric, piezo stack, piezoceramic, magnetostrictive or other reduced size actuators to rotate one or more actuated compressor stator vanes and/or inlet guide vanes in turbine engines allows reduced size and weight for such actuators which in turn enables smaller, lighter turbine engines that have numerous applications but are especially well adapted for use in small aircraft and Unmanned Air Vehicles (UAVs) or drones. In such applications, the fluid controlling vanes are typically inlet guide vanes or compressor stator vanes.

2. Background

Vanes for fluid control are used in numerous applications. It is often desirable in many applications that such vanes be controllable for purposes of rotating such vanes about an axis in order to achieve desired characteristics of the flow of the affected fluid. Such rotation may be used, for example, to reduce turbulence and increase desirable laminar flow of a fluid, which in turn may reduce drag and increase the effectiveness of the system that is making use of the fluid. The scope of the present invention is such that it is usable in any application where such fluid control is desired. One such application is the field of small jet turbine engines used for the propulsion of aircraft: in such application the fluid is air, and the desire is to effectuate certain desirable properties of the air that is entering the engine intake and progressing through the following compression and other jet turbine stages.

A turbine is a rotary engine that extracts energy from a fluid flow and converts it into useful work. Turbine engines for use as propulsion systems for aircraft are well known in the art. Such engines have been adapted for various sizes of manned aircraft and other vehicles and are typically comprised of an upstream compressor section coupled to a downstream turbine with a combustion chamber in-between.

The compressor section of a turbine engine increases the pressure and conditions airflow before the air enters the combustion chamber. The airflow entering the compressor is often turbulent due to the high angle of incidence between engine inlet and free-stream velocity, or existing atmospheric turbulence. Additional factors or operational changes that may influence or affect turbine engines include but are not limited to inlet air speed, air temperature, humidity, density, and the like. It is desirable to effectuate control over the inlet air dynamics in order to increase the efficiency of operation of the turbine engine: to this end, devices termed "inlet guide vanes", or IGVs, are sometimes incorporated into the engine design. Inlet guide vanes are typically placed in the intake air flow in front of the compressor section of a turbine engine in order to better direct air flow into the compressor sector and to reduce the turbulence of the incoming air. Actuated, or variable, IGVs are IGVs that are typically rotatable on an axis that is radially oriented to the axis of the turbine engine. Variable IGVs are rotated (or, in other words, pivoted) about their axis in order to increase their effectiveness in reducing the turbulence of the intake air flow. The rotating of variable IGVs allows the angle of attack of IGVs to be optimized relative to the direction of flow of the intake air. The rotating feature of variable IGVs is thus used to help control the relative angle of incidence of the flow that enters the engine compressor, thereby preventing flow separation, compressor stall, and further extending the compressor's operating envelope.

For the same reasons, variable, or rotating, Compressor Stator Vanes (CSVs) are desirable to aid in optimizing the air flow and reducing turbulence in the compressor stage of a jet turbine engine.

Conventional large scale turbine jet engines that generally employ variable IGVs have been developed by Rolls Royce in their Trent DR-900 and General Electric in their model J79. The original engine employing variable IGVs was the General Electric model J73 turbojet engine. Current actuation of CSVs or IGVs on such large scale engines is routinely performed by servomotor or hydraulic means. Such servomotor or hydraulic actuation in large scale jet engines, however, cannot be functionally translated into smaller jet engine applications due to the severe size and weight constraints that are imposed upon these smaller engines. The hydraulic pump, fluid lines, and actuators are simply too large and heavy for small jet turbine applications. The same is true for servomotor actuation systems: the controllers, motors, wiring and actuators of servomotor actuation systems exhibit the same weight and size problems as hydraulic systems when considered for small jet turbine engines. There are other problems with these legacy actuation systems as well. Hydraulic actuation of small (e.g. 5-cm long) vanes is difficult to achieve due to geometric scaling. Geometric down scaling of hydraulic circuit components for small engines would imply very small-diameter hydraulic lines and naturally lead to fluid friction losses. Additionally, as stated above servomotors are generally too heavy (due to coils, magnets, and the like) to be useful in small jet engine applications. Jet engines designed especially for UAVs are characterized by thrust force on the order of 100N and, due to their size and weight limitations, lack advanced flow control devices such as inlet guide vanes and/or compressor stator vanes. There is therefore a need for an improved, light weight system and apparatus for implementing variable IGV were available, smaller aircraft would reap the benefits of the performance improvements afforded by variable IGV and/or CSV.

An example of a vehicle that would benefit from the downsizing and reduction in weight and size of variable IGV and CSV assemblies is the Unmanned Aerial Vehicle (UAV), or drone. UAVs have gained popularity in recent years to become an indispensable part of aerial missions that may include reconnaissance, surveillance, law enforcement, border patrol, communication support, and the like. As a result, advancements in small jet-engine performance, and reduction in size and weight, are needed to increase the performance (range, payload and efficiency) of the UAV.

Variable inlet guide vane actuation systems and control methods of the prior art have been described but are not well adapted to small lightweight applications. For instance, U.S. Pat. No. 3,628,329 to Spencer describes an inlet guide vane actuator comprised of a which positions an element upon sensing a parameter and, after a certain time limit has elapsed, automatically repositions the element to its initial position. A central solid rod is surrounded by a thin perforated sleeve constructed of material having the same coefficient of expansion as the rod. The rod and sleeve are rigidly interconnected at one end, and hot gas is passed in a swirling manner along the axis of the actuator. The time differential expansion of the two members is utilized to initially position and then reposition a controlled element. However the apparatus of this invention does not allow for instantaneous and controlled positioning of an IGV or CSV, and furthermore may be of such size as to be unusable in small turbine engines.

A system for controlling the motion of turbomachinery is disclosed in U.S. Pat. No. 5,141,391. This U.S. patent discloses a control system that actively controls at least one troublesome mode of an unsteady motion phenomenon in turbomachinery in order to enable an increase in the operating range of the turbomachinery. For example, rotor blade flutter or rotating stall may be controlled in a turbocompressor. The control system has a control bandwidth which is at least partly coextensive with the bandwidth of the unsteady motion phenomenon and operates by passing sensor signals related to the unsteady motion phenomenon from a sensor array in the turbomachine to a mode filter which produces a signal or signals which are related to the troublesome mode or modes. The selected mode signals are amplified and phase-shifted by time-variable amounts so as to produce control signals having controlled amplitude and phase relationship to the troublesome mode. Actuators in an actuator array may be continuously driven by the control signals and produce physical effects in the turbomachine which act counter to the troublesome mode without exciting others. While this U.S. patent discloses a method for controlling actuation of components of a turbomachine such as a turbine engine, it does not disclose mechanisms for achieving the rotation of inlet guide vanes or compressor stator vanes and thus does not answer the need for reduced size and weight vane actuation systems.

U.S. Pat. No. 7,096,657 to Mahoney et al. discloses an inlet guide vane actuation system that achieves positioning of inlet guide vanes in a gas turbine engine into open, intermediate and closed positions. This U.S. patent discloses an electromechanical inlet guide vane actuation system that includes one or more electric motor driven actuators that are used to appropriately position the inlet guide vanes in a gas turbine engine. The actuation system includes a control circuit that supplies guide vane actuation control signals in response to guide vane position command signals it receives. The guide vane actuation control signals are supplied to one or more electric motors, which position actuators, and thus the inlet guide vanes, to the commanded position. The electromechanical components of this system are adapted to large gas turbine engines and do not achieve the size and weight reductions necessary to be compatible with very small turbine engines.

U.S. Pre Grant Publication No. US2009/0297334 describes a sensing and control method for determining a desired positioning for inlet guide vanes. However, this disclosure does not disclose an apparatus for positioning guide vanes to a desired position.

A need therefore exists for a technology innovation and improvement upon the state of the prior art that would allow variable IGVs and/or CSVs on smaller jet engines (for example, but not by way of limitation, 20-200 lb thrust), such as in increasingly popular UAV applications, where servomotor/hydraulic actuation is either impossible or very difficult to implement on the smaller engines due to size issues, weight tolerances, frictional losses, and the like.

BRIEF SUMMARY OF THE INVENTION

The present invention solves the aforementioned problems in the current state of the art. The present invention is a novel vane rotating apparatus and method that is especially beneficial, for example, to achieve rotation and precise control of small turbine engine inlet guide vanes (IGV) and/or compressor stator vanes (CSV). The vane rotating apparatus of the invention achieves significant reduction in weight and size over the systems of the prior art. In a preferred embodiment, the present invention may employ a piezoelectric inchworm actuator (or a piezo stack actuator or magnetostrictive actuator, depending upon actuation requirements) to actively modify the angle of attack of a single or a plurality of inlet guide vanes or compressor stator vanes in a turbine engine. The change in angle of attack is necessary due to large variations in engine operating envelope including but not limited to air density, velocity, temperature, and the like. The present invention is especially suitable to actuate small vanes found in small turbine jet engines including but not limited to those under ten (10) inches in diameter.

Piezoelectric inchworm actuators (or piezo stack actuators) provide a wide variety of advantages over previous actuation methods known within the art including but not limited to greater overall simplicity, compactness, lower maintenance costs, lower overall weight, higher reliability, are less prone to prone to failure over environmental extremes, and the like. In its simplest form, the piezoelectric inchworm actuator uses three piezo-actuators mounted inside a tube which are electrified in sequence in order to grip a shaft which is then moved in a linear direction. Motion of the shaft is due to the extension of the lateral piezo pushing on two clutching piezoelectric elements as further described herein. The adaptation of piezoelectric inchworm actuator to rotate turbine engine IGVs and CSVs yields a significant reduction in weight in the variable IGV and CSV systems of the prior art.

The conventional variable IGVs and CSVs in large engine applications cannot be downscaled as such hydraulic actuation must utilize a network of pipes and capacitors with servomotors that are electrically actuated and quite heavy. The present inventive solution eliminates detrimental reliance on the conventional hydraulic hardware as well as any complications and/or fluid losses associated therewith. Depending on loads and displacement requirements either piezoelectric inchworm actuators for high-displacement, slower speed, and high precision applications or piezo stack actuators for small-displacement, high speed, and high precision applications may be utilized, as disclosed herein, to solve the problems inherent to the prior art systems and methods.

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

Although the following detailed description and included drawings contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Current actuation of CSV or IGV on large scale engines (e.g. GE J79) is performed via servomotor/hydraulic means. The novel systems and methods of the present invention provide the benefits of compactness and simplicity by incorporating piezoelectric-based actuators (e.g. piezoelectric inchworm actuators). Conventional hydraulic actuation of small (e.g. 5-cm long) vanes is difficult to achieve due to geometric scaling and structural inefficiencies and overweight issues that arise when downscaling such hydraulic actuation systems. The inventive use of piezoelectric inchworm actuators or piezoceramic stack actuators allows for the incorporation of CSV and/or IGV on small turbine engines with the improved performance characteristics known to be associated therewith.

For the sake of clarity, the description of the invention provided herein focuses on the use of piezoelectric actuators as the actuating element of the vane rotating apparatus of the invention. The use of piezoelectric actuators in the present invention is a preferred embodiment. It is to be understood, however, that the scope of the invention includes all other actuators in which the application of a voltage or current cause the expansion of a core material such as piezoceramic actuators, magnetostrictive actuators, piezo stack actuators and the like. The scope of the present invention is therefore not to be limited to piezoelectric actuators alone. It is also within the scope of the invention that actuators of different types may be used to achieve IGV or CSV actuation on a single turbine engine in alternate embodiments of the invention.

Figure 1:
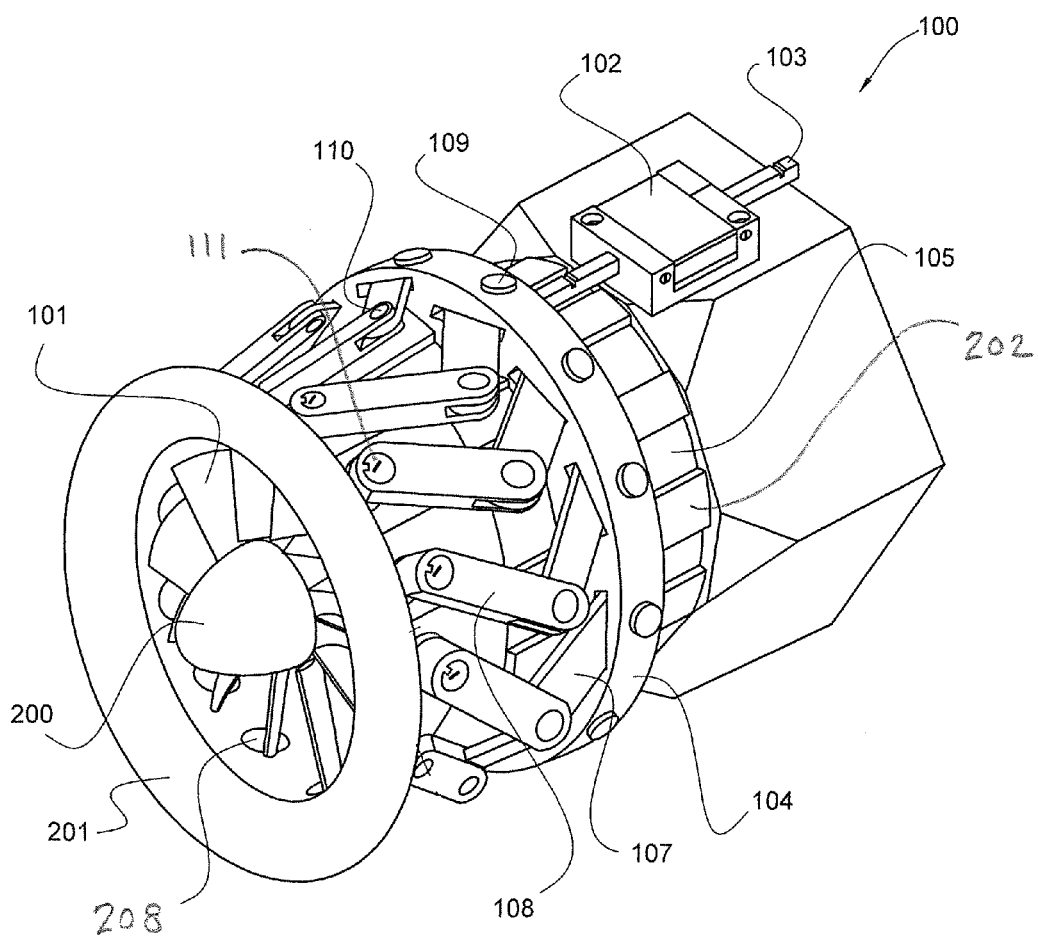
FIG. 1 depicts a perspective view of an embodiment of the vane rotating apparatus of the invention, in which an inlet guide vane rotating system of the invention is shown installed on an exemplary turbine engine.

FIG. 1 depicts one embodiment of a vane rotating apparatus of the invention 100 as installed on an exemplary turbine engine. A turbine engine may typically comprise a plurality of variable inlet guide vanes 101. Although it would be possible for a turbine engine to utilize only one variable inlet guide vane, and such embodiments are within the scope of the invention, such application would not be preferred. The scope of the present invention in includes the use of one or more, but preferably a plurality, of vanes and actuators. In the preferred embodiment depicted in the figures, actuation, or rotation, of one or more pivoting vanes 101 of an exemplary turbine engine may be initiated by a piezoelectric inchworm electric actuator 102, piezoceramic actuator, magnetostrictive actuator, piezo stacked actuator or other alternate actuator.

Figure 5:
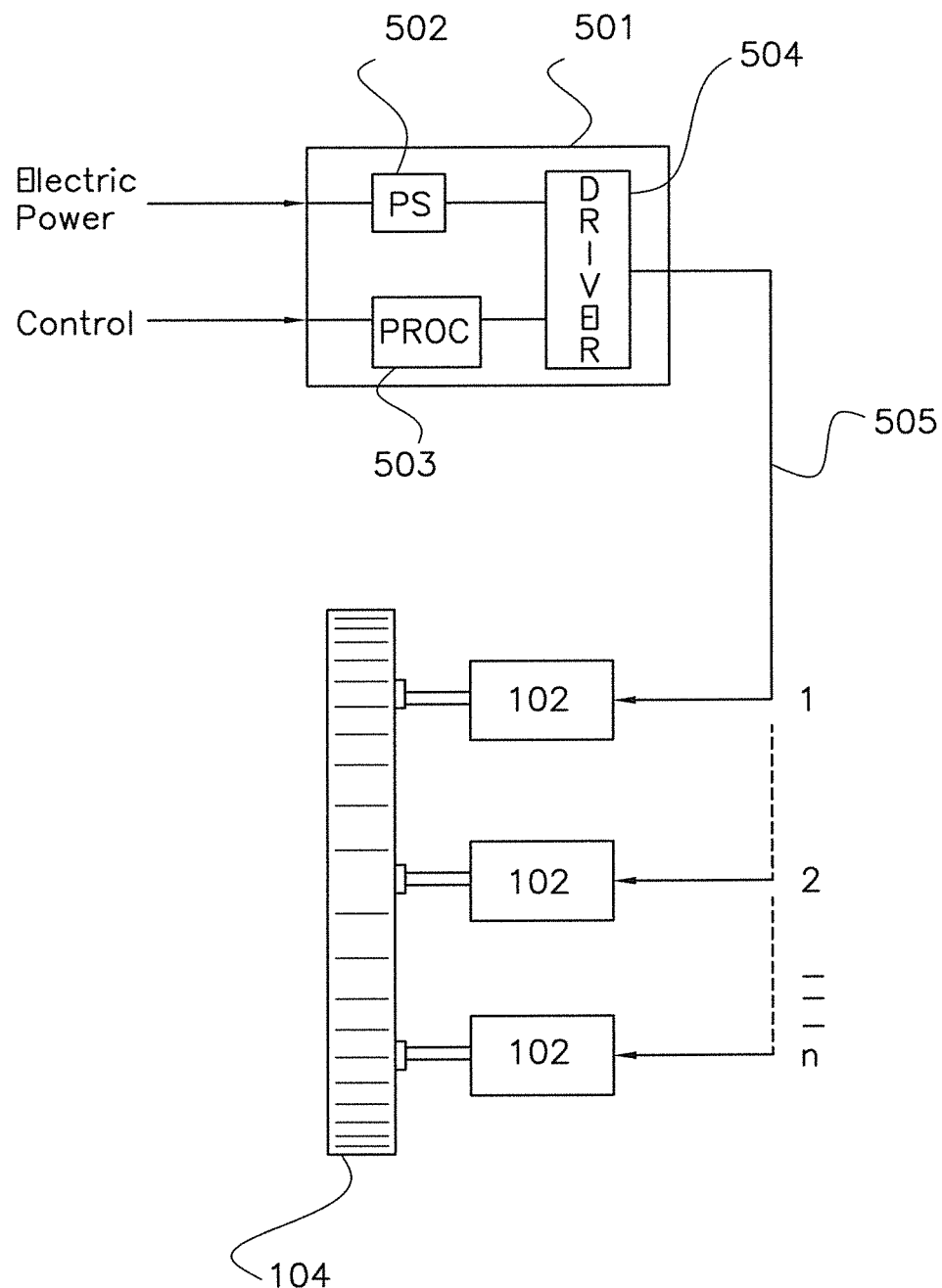
FIG. 5 depicts an exemplary block diagram of the electrical components of the vane rotating apparatus of the invention.

Piezoelectric inchworm actuator 102 is typically comprised of piezoelectric actuator shaft 103, which is adapted to translate linearly upon receipt of a control signal from the inlet guide vane controller 501 as further described below in the discussion of FIG. 5. Piezoelectric actuator shaft 103 is in mechanical communication with slider ring 104 and may push and/or pull slider ring 104 upon actuation of piezoelectric actuator 102, wherein slider ring 104 may translate in either direction along the longitudinal axis of the turbine engine, guided by guide rail grooves 105, which are a part of a first supporting structure 202 as shown in (in this case, the first supporting structure is the structure of an exemplary turbine engine). Thus slider ring 104 translates in a rectilinear manner along the longitudinal axis of the exemplary turbine engine. Translation of the slider ring 104 along the longitudinal axis of the turbine engine acts to manipulate one or more crank slider mechanisms 106. Each crank slider mechanism may be comprised of a first arm 107 which is rotatably connected to slider ring 104 at a proximal end by means of first pivot pin 109 or equivalent structure, and is also rotatably connected to second arm 108 at the distal end of first arm 107 by means of second pivot pin 110 or equivalent structure as shown in FIG. 1 and further in FIGS. 2, 3, 6, 7, 8, 9, 10, and 11. The proximal end of each crank slider mechanism 106 is comprised of proximal end of first arm 107, and the distal end of each crank slider mechanism 106 is comprised of the distal end of second arm 108. The proximal end of each crank slider mechanism 106 is rotatably connected to slider ring 104 via first pivot pin 109 or equivalent structure, and the distal end of each crank slider mechanism 106 is connected to a pivoting vane which may be one of a plurality of pivoting vanes 101. The distal end of second arm 108 is affixed to vane pin 204. Vane pin 204 is also affixed to pivoting vane 101 such that pivoting vane 101 rotates when piezoelectric actuator 102 operates to cause piezoelectric actuator shaft 103 to move rectilinearly, which in turn causes slider ring 104 to translate along the longitudinal axis of the turbine engine in a rectilinear fashion, guided by guide rails 105, which in turn causes crank slider mechanism 106 to shorten or lengthen in the longitudinal direction, which causes rotation of second pivot pin 110 which in turn causes rotation of the pivoting vane 101 to which second pin 110 is attached. In this manner, rotation of the vanes about vane pin axis 206 is achieved when piezoelectric inchworm actuator 102 is operated. The amount of rotation may be set to any value desired by the operator.

Figure 2:
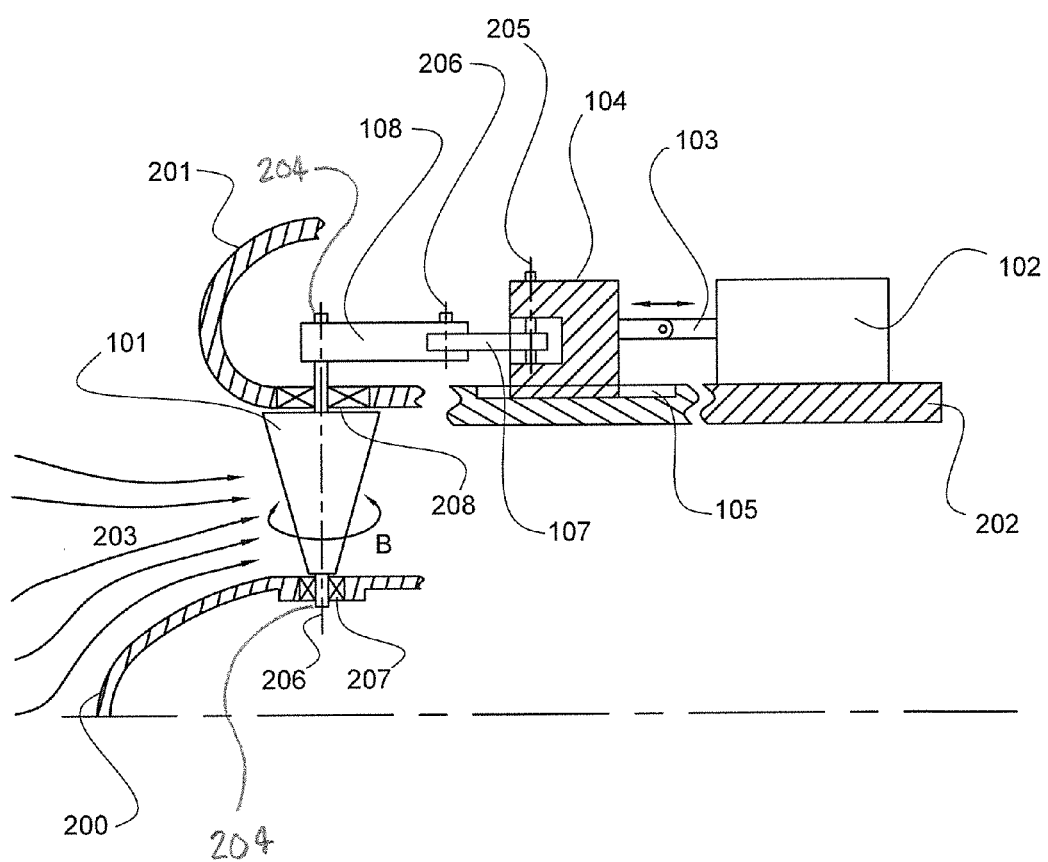
FIG. 2 depicts a cross section view of an exemplary installation of the vane rotating apparatus of the invention as installed on an exemplary turbine engine, in which components of the exemplary turbine engine are not shown for clarity, and only components of the turbine engine which are typically in mechanical communication with the vane rotating apparatus of the invention are shown.

FIG. 2 illustrates a cross section of an exemplary turbine engine that has been fitted with an vane rotating apparatus of the invention 100. Uncompressed inlet air 203 flows around turbine nose 200 and enters the area pivoting vane 101, whereupon pivoting vane 101 serves to modify the air flow by reducing turbulence, directing air further into the turbine for compression, combustion and exhaust, and other effects as desired by the operator. The shape of pivoting vane 101 may take any of the shapes known in the art of inlet guide vanes, or any shaped desired, and thus the shape of the vane itself is not to be considered a limitation of the present invention. One or more pivoting vanes 101 may be rotated in place to a desired angle on vane pin axis 206, thus achieving the desired effect on airflow 203.

Figure 3:
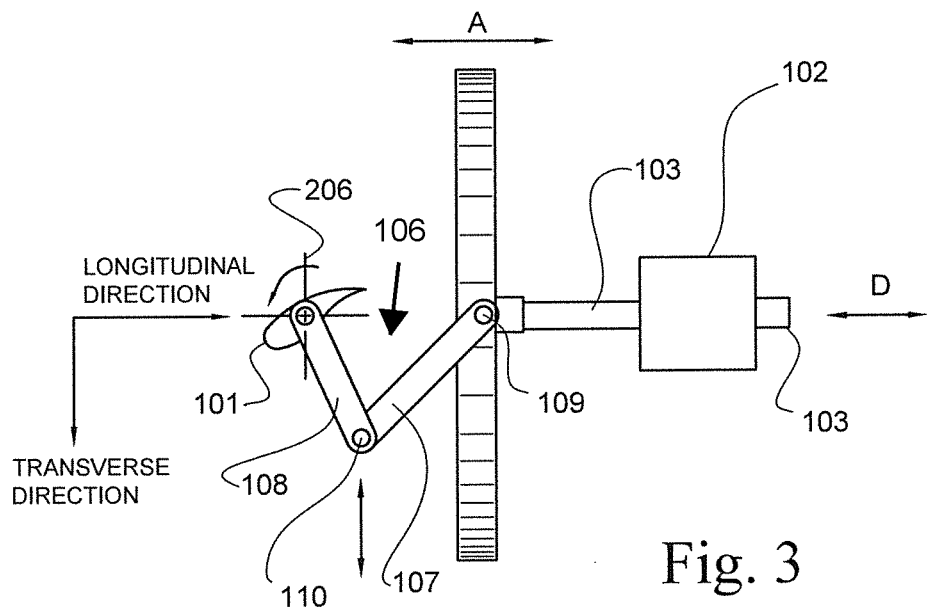
FIG. 3 depicts a view of the vane rotating apparatus of the invention shown schematically.
Figure 3A:
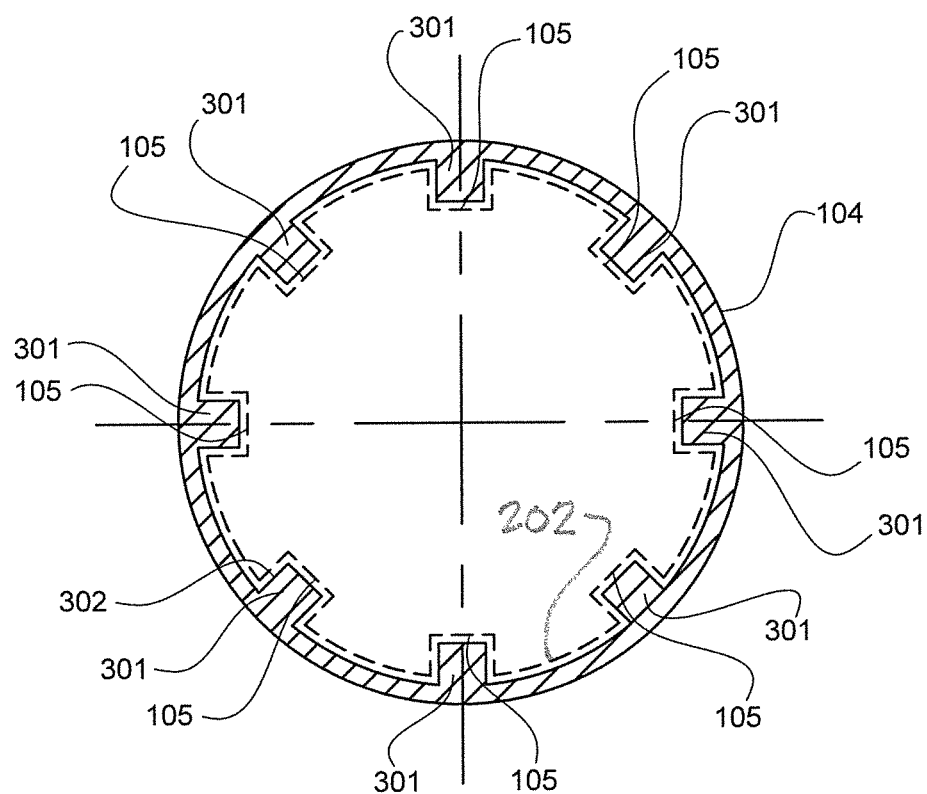
FIG. 3a depicts a cross sectional view of one embodiment of the slider ring of the invention and also depicts the mechanical communication between the slider ring of the invention and an exemplary turbine engine structure containing guide rail grooves.

FIG. 3 depicts a schematic top view of the vane rotating apparatus of the invention 100. In this view, only one vane rotating apparatus of the invention is shown for clarity, but it is understood that a plurality of vane rotating apparatus' may be employed. Piezoelectric inchworm actuator 102, which is affixed to the structure of the turbine engine by any means known in the art, and is stationary during operation, operates to translate piezoelectric actuator shaft 103 longitudinally as shown by arrow D. This movement D by piezoelectric actuator shaft 103 causes slider ring 104 to translate longitudinally, as depicted by arrow A, because piezoelectric actuator shaft 103 is in mechanical communication with, and is connected to, slider ring 104 as shown in the figures by any means known in the art. The longitudinal movement of slider ring 104 is controlled by at least one guide rail groove or equivalent structure 105 which is a part of first supporting structure 202 and which is slidingly engaged with slider ring guide or equivalent structure 301 as shown in FIG. 3a. In a preferred embodiment of the invention a plurality of guide rail grooves 105 are slidingly engaged with a matching plurality of slider ring guides 301 as depicted in FIG. 3a.

Referring back now to FIG. 3, it can easily be seen that as slider ring 104 is translated longitudinally by the operation of piezoelectric inchworm actuator 102, crank slider mechanism 106 is operated to achieve rotation B of pivoting vane 101 as follows: because vane pin 204 is affixed to pivoting vane 101 and is also rotatably connected to the third supporting structure 201 so as to rotate on vane pin axis 206, the translation of slider ring 104 causes crank slider mechanism 106 to articulate such that it translates in a transverse direction as depicted by arrow C. This articulation of crank slider mechanism 106 causes a rotation of vane pin 204, which in turn causes a rotation of pivoting vane 101 because vane pin 204 is affixed to pivoting vane 101 and is also rotatably connected to a second supporting structure 200 (in the embodiment shown, second supporting structure 200 is the nose cone of a turbine engine) by first pivot vane bearing 207 at an inner mounting point. Vane pin 204 is also rotatably connected to a third supporting structure 201 (in the embodiment shown, third supporting structure 201 is the intake section structure of a turbine engine) by second pivot vane bearing 208 at an outer mounting point. Thus, pivoting vane 101 is able to rotate on vane pin axis 206 as shown by arrow B, but pivoting vane 101 is otherwise held securely in translational position. The structure achieving fixation of vane pin 204 to pivoting vane 101 may comprise any connection capable of imparting rotation of the distal end of second arm 108 to pivoting vane 101, wherein such connection may include but is not limited to a tongue and groove joint, post and hole joint, chemically bonding, and any other structure known in the art for affixing a pin to a structure. Pivoting vane 101 may pivot on vane pin axis 206 by use of a roller or journal bearing 207 at the inner mounting point and a roller or journal bearing 208 at the outer mounting point, or, alternatively, any other bearing structure as is known in the art that allows rotation of pivoting vane 101 while holding vane 110 translationally in place, such as, for example, the structure disclosed in U.S. Pat. No. 4,950,129 to Patel et al. which is herein incorporated in its entirety by reference, may be used. The rotatable connections which secure vane pin 204 to the engine structure and allow pivoting vane 101 to rotate on vane pin axis 206 may be comprised of any rotatable structure known in the art for rotatably connecting a shaft to a supporting structure while holding the shaft translationally in place such as, for example and not by way of limitation, the roller or journal bearings mentioned above, or may be comprised of sleeve bearings, thrust bearings, or any similar structure known in the art. The structures of bearings 207 and 208 are not to be considered limitations on the present invention, as the art of rotatably connecting a shaft to a supporting structure is well understood. It is also within the scope of the invention that alternate embodiments may use no bearings whatsoever but may rely on the properties of the materials used in the fabrication of vane pin 204 and the supporting structure to provide the rotatable connection which allows pivoting vane 101 to rotate about vane pin axis 206. Furthermore, vane pin 204 need not be a single pin but may comprise separate pins at the inner and outer mounting points.

It is to be noted that turbine engines are of different shapes, sizes and structure each of which is generally determined by the application in which the turbine will be utilized; size constraints; weight constraints; the placement, shape and orientation of the numerous internal elements of the turbine; the shape of the volume available for the turbine and other relevant factors. Such factors typically dictate a particular shape for the mechanical supporting structure of the turbine. It is to be noted therefore that the present invention may be adapted to any turbine that utilizes inlet guide vanes and/or compressor stator vanes where it is desirable to pivot or rotate the vanes; thus the shape of the structural elements of an turbine engine upon which the vane rotating apparatus of the invention 100 are not to be construed as limitations of the invention. Thus, first supporting structure 202 (which is shown in the figures as the internal structure of a turbine engine), second supporting structure 200 (which is shown in the figures as a turbine nose cone), and third supporting structure 201 (which is shown in the figures as part of the structure of the intake section of a turbine engine), and any other turbine structure depicted in the figures, are to be construed as typical structures shown for exemplary purposes only and are not be construed as limitations to the scope or nature of the claims. In some applications, structures 200, 201, and 202 may be part of the same contiguous structure.

Referring now to FIG. 3a, a cross section of slider ring 104 and first supporting structure 202 is depicted. Slider ring 104 is comprised of at least one, and preferably a plurality, of slider ring guides 301. Slider ring guides 301 are slidingly engaged with matching guide rail grooves 105 which allow slider ring 104 to translate longitudinally in a controlled fashion when piezoelectric actuator 102 is operated. In an alternative embodiment, one or more optional slider guide bearings may be utilized to reduce friction between the surfaces of guide rail grooves 105 and slider ring guides 301. There may be a plurality of optional slider guide bearings. Optional slider guide bearings may be affixed to either guide rail grooves 105 or slider ring guides 301. Optional slider guide bearings may be affixed to the side walls of slider ring guides 301 as one example of a use of optional slider guide bearings; however, optional slider guide bearings may be affixed to any surface of guide rail grooves 105 or slider ring guides 301. The use of optional slider guide bearings guide rail may serve to reduce friction and allow smoother translation of slider ring 104 as it is slidingly engaged with first supporting structure 202. Slider guide bearings may be comprised of any material that reduces sliding and static friction between the surfaces of guide rail grooves 105 and slider ring guides 301 and is capable of withstanding the temperatures of the location within the turbine engine. Such temperatures will typically vary depending on the application.

Figure 4:
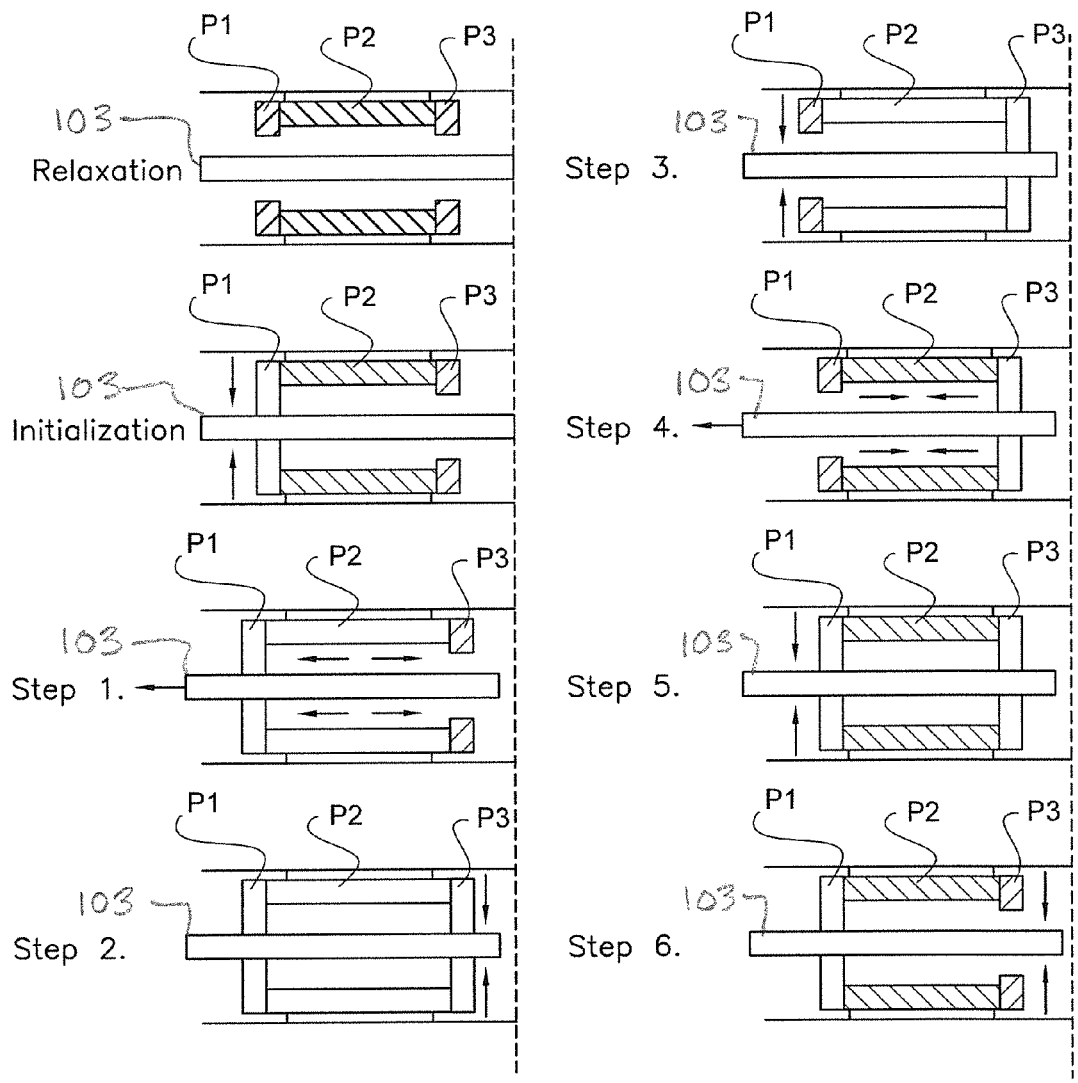
FIG. 4 depicts a step-by-step operation of an exemplary piezoelectric inchworm actuator.

Piezoelectric inchworm actuator 102 may be any piezoelectric actuator capable of causing translation of piezoelectric actuator shaft 103 upon the application of a control signal, but is preferably of the type known in the art as piezoelectric inchworm actuators. Such actuators use a combination of piezoelectric elements to sequentially grip, translate, and release a shaft or similar structure, causing the shaft or similar structure to translate in a controlled manner. A general schematic and operation of a typical piezoelectric inchworm actuator is depicted in FIG. 4. Such piezoelectric inchworm actuators, which are known in the art, provide precise (nano or micro scale resolution) and larger displacements (millimeter or centimeter scale) than typical piezoceramic stack actuators.

Referring now to FIG. 4, an exemplary piezoelectric inchworm actuator is depicted which is comprised of three piezoelectric components P1, P2 and P3. A piezoelectric material, as is known in the art, is one which exhibits a correlation between mechanical stress and applied electric voltage. When a voltage is applied to a piezoelectric material, the material will experience expansion because of its piezoelectric properties. Exemplary piezoelectric components P1 and P3 are of appropriate dimension such that they will each expand to contact piezoelectric actuator shaft 103 upon the application of a control voltage. It is to be noted that the scope of the invention is not to be limited by the number or configuration of piezoelectric components utilized in piezoelectric inchworm actuator 102. It is to be noted that the exemplary piezoelectric inchworm actuator process depicted in FIG. 4 may comprise a fewer or greater number of steps, thus the steps shown in FIG. 4, while typical, are not to be construed as a limitation of the invention.

Still referring to FIG. 4, an initial state of the actuator may be described as the relaxed state as shown in the state marked Relaxation in FIG. 4. In the relaxed state there is either no voltage applied to the piezoelectric components P1, P2 or P3 of the actuator; or, if there is a voltage applied, it is not sufficient to cause either of components P1 or P3 to grip piezoelectric actuator shaft 103. Thus in the relaxed state piezoelectric actuator shaft 103 is not gripped by either P1 or P3. The typical first step of actuation in which it is desired to cause translation of piezoelectric actuator shaft 103 is to apply a first control voltage to piezoelectric component P1 which causes P1 to expand and thus grip piezoelectric actuator shaft 103 as shown in the Initialization step of FIG. 4. Next, a second control voltage is applied to piezoelectric component P2 which causes translation of piezoelectric actuator shaft 103 due to the grip of piezoelectric component P1 on the shaft. This is shown as Step 1 in FIG. 4. Next, a third control voltage is applied to piezoelectric component P3 which causes piezoelectric component P3 to expand and grip piezoelectric actuator shaft 103 as is depicted as Step 2 in FIG. 4. The first control voltage applied to piezoelectric component P1 is then released, allowing piezoelectric component P1 to relax to its original state and thus release its grip on piezoelectric actuator shaft 103 as shown in Step 3 in FIG. 4. Next, the second control voltage applied to piezoelectric component P2 is released, which allows piezoelectric component P2 to relax and further causing translation of piezoelectric actuator shaft 103 to the left yet again as shown in Step 4 in FIG. 4. In Step 5 the first control voltage is re-applied to piezoelectric component P1 which causes P1 to expand and thus grip piezoelectric actuator shaft 103, and finally the third control voltage applied to piezoelectric component P3 is released which allows piezoelectric component P3 to relax as shown in Step 6 of FIG. 6. Thus, piezoelectric actuator shaft 103 has been translated to the left in FIG. 4 and is left held in place by the applied first control voltage acting upon piezoelectric component P1 to cause piezoelectric component P1 to grip piezoelectric actuator shaft 103 and to hold it in place until further translation of piezoelectric actuator shaft 103 is desired.

Such piezoelectric inchworm actuators 102 are manufactured by many companies, including but not limited to Physik Instrumente™. For example, the PI™ N-310 NEXACT™ OEM Miniature Linear Motor/Actuator exhibits linear push/pull force of a maximum 10 N, while providing a maximum of 125 mm and a minimum of 20 mm of travel with 25 nm displacement resolution. In one embodiment, piezoelectric inchworm actuators 102 may have a block shape with 25 mm×25 mm×12 mm dimensions. The control voltage required for actuation may comprise 40V or less. Piezoelectric inchworm actuators 102 may also have the ability to be self-locking. Smart-material piezoelectric actuators of the type which comprise the present invention have been found to be simpler, less prone to failure, and more compact than conventional hydraulic actuators. During development of the present invention, design calculations confirmed the feasibility of having IGV and/or CSV actuation performed by an actuation mechanism based on a small, compact smart-material based piezoelectric inchworm actuators 102. The dimensions and voltages provided herein are for exemplary purposes only. It is to be noted that dimensions of the actuator, the shape of piezoelectric actuator 102 and the level of the applied voltages are not to be considered limitations of the invention. It is also to be understood that the piezoelectric or other actuators of the invention may themselves be of cylindrical shape, which is then housed within a housing that facilitates mounting onto the structure of the turbine engine. Thus, the piezoelectric actuator 102 is shown in the Figures as a rectangular solid. The housing of piezoelectric actuator 102 is affixed to the first supporting structure 202 by any means known in the art for affixing one structure to another, but is preferably bolted in place.

It is easily seen that the sequence of applied voltage may be timed and controlled so as to cause translation of piezoelectric actuator shaft 103 in either direction, or to hold it in place, by alternating the applied control voltages in the manner described above, only in a different sequence, in order to achieve the desired direction an amount of actuation of piezoelectric actuator shaft 103. Referring now to FIG. 5, a piezoelectric actuator controller 501 is depicted which controls the actuation of piezoelectric inchworm actuator 102. The application of the control voltages to the piezoelectric component is controlled by piezoelectric actuator controller 501 which is in communication with piezoelectric inchworm actuators 102 via electrical cabling 505. The inlet guide vane pivoting system of the invention 100 may be comprised of one or more piezoelectric inchworm actuators 102. Piezoelectric actuator controller 501 may further be comprised of a digital or other processor 503, an internal power supply 502 which converts the available external power voltage or voltages to voltages for use by the internal components of piezoelectric actuator controller 501, and driver circuitry 504 which accepts commands from processor 503 and accepts electrical power from internal power supply 502 and produces the actual control voltages that are communicated to the one or more piezoelectric inchworm actuators 102 by cabling 505.

Figure 6:
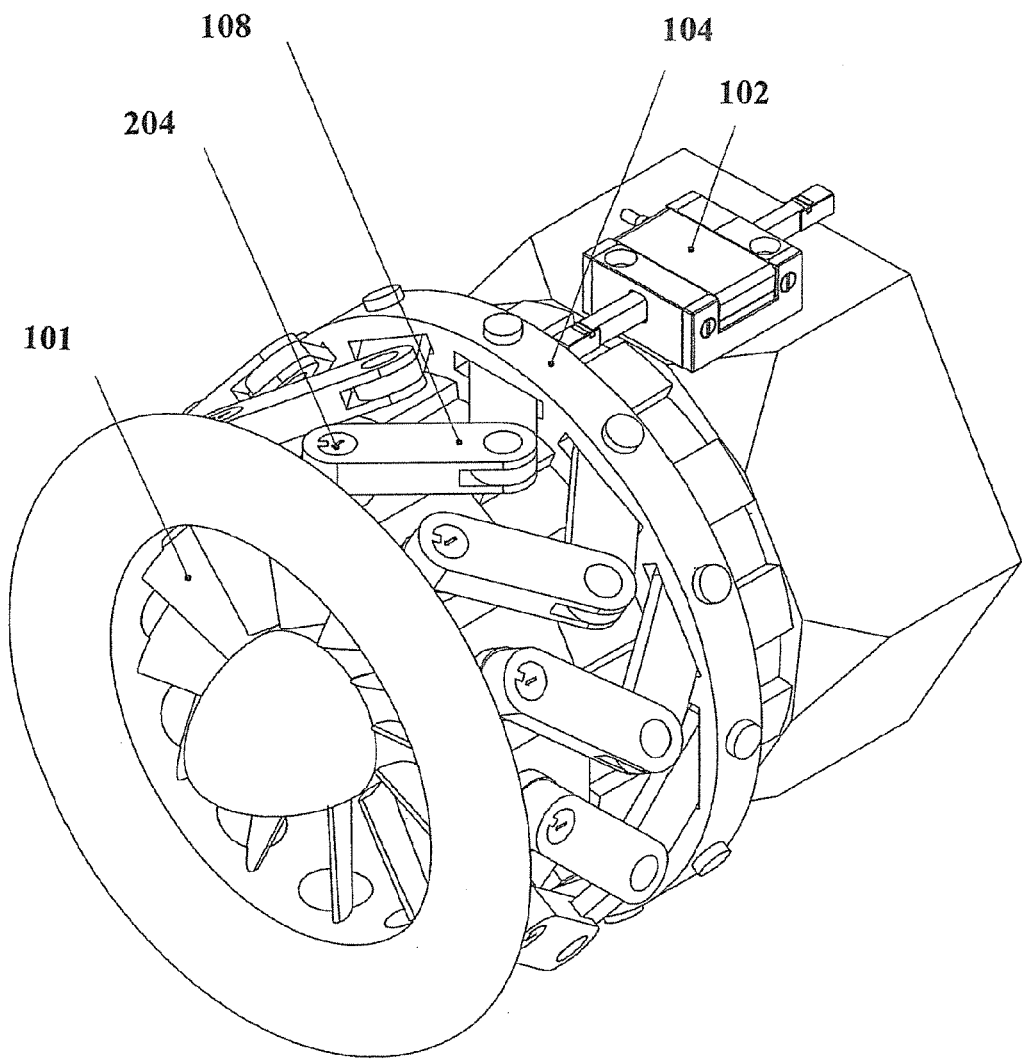
FIG. 6 depicts a top perspective view of three dimensionally rendered embodiment of the present invention at approximately 0% actuation.
Figure 7:
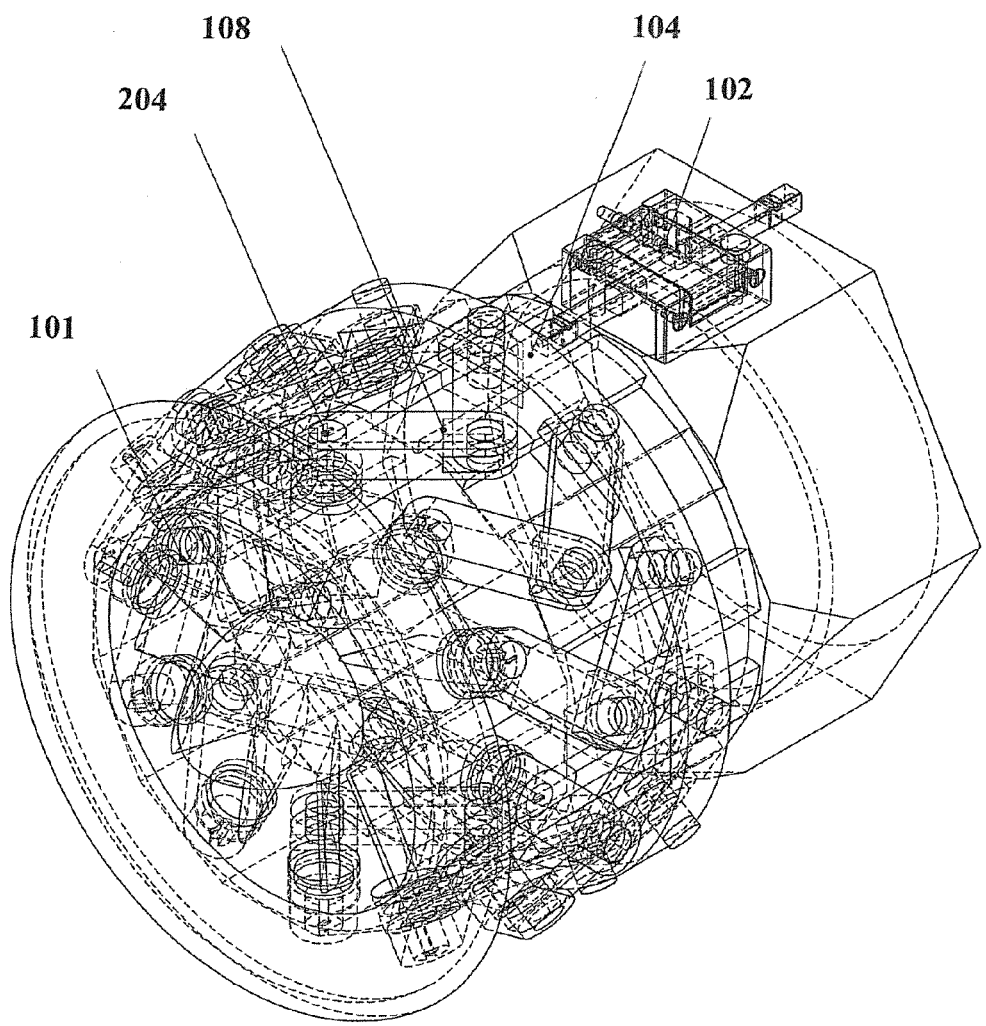
FIG. 7 depicts a top perspective view of a ghost line drawing of the present invention at approximately 0% actuation.
Figure 8:
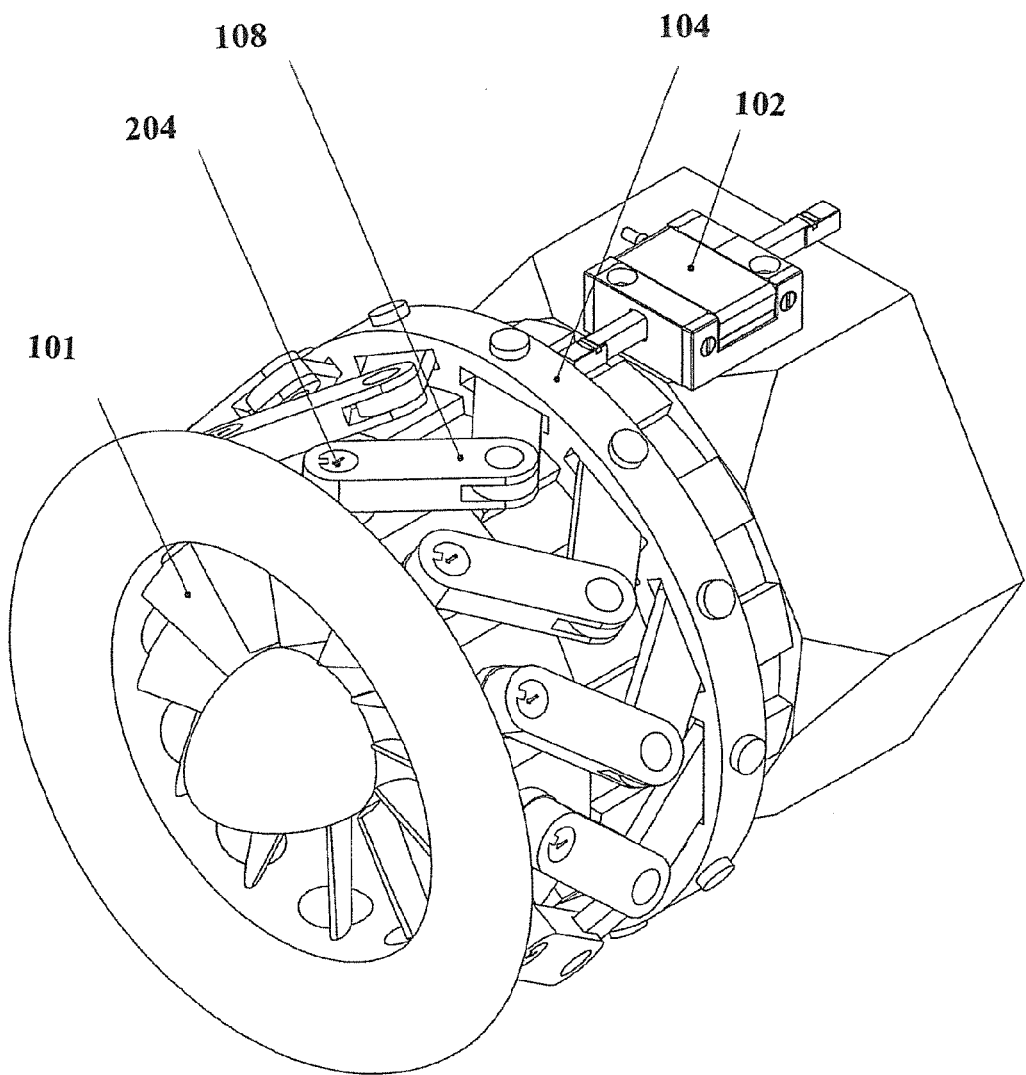
FIG. 8 depicts a top perspective view of a three dimensionally rendered embodiment of the present invention at approximately 33% actuation.
Figure 9:
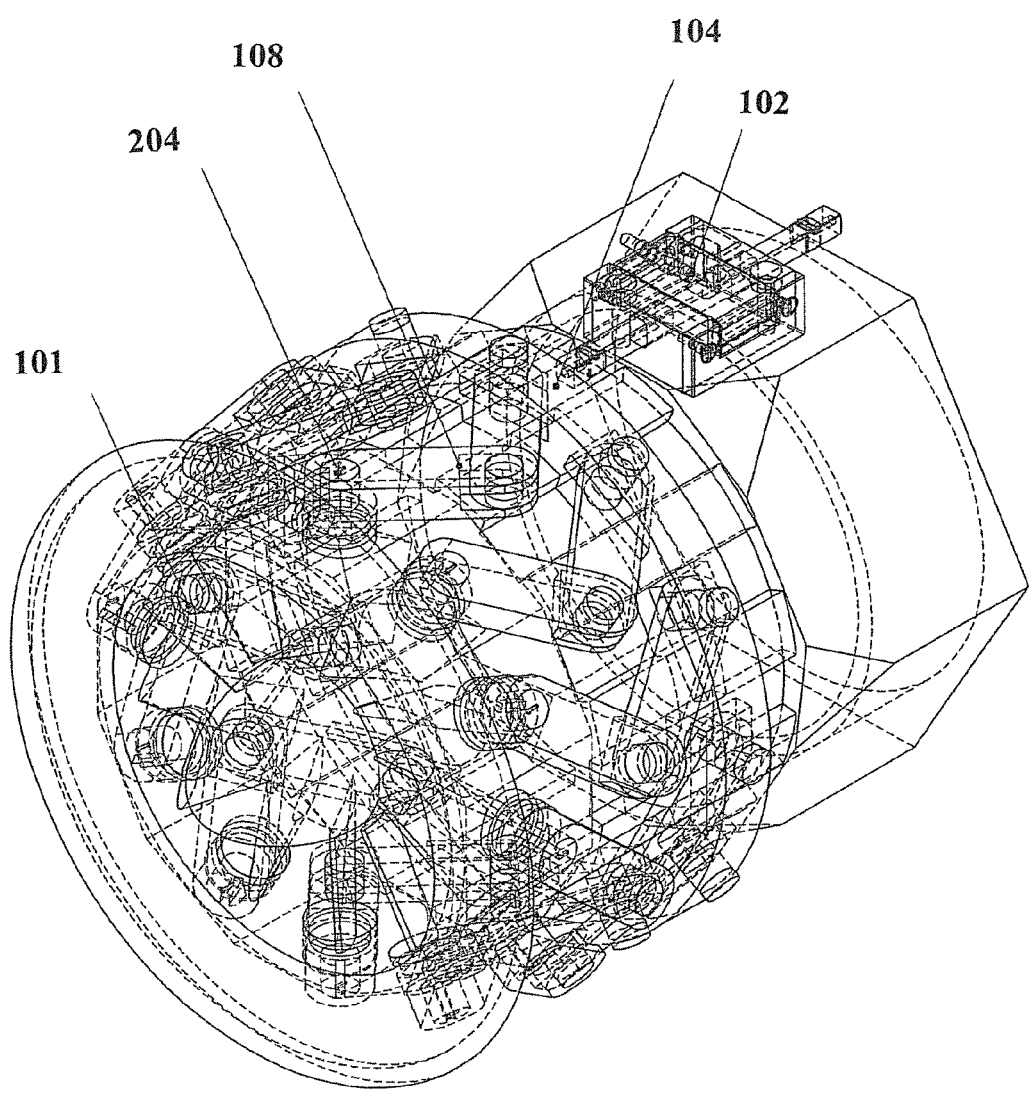
FIG. 9 depicts a top perspective view of a ghost line drawing of the present invention at approximately 33% actuation.
Figure 10:
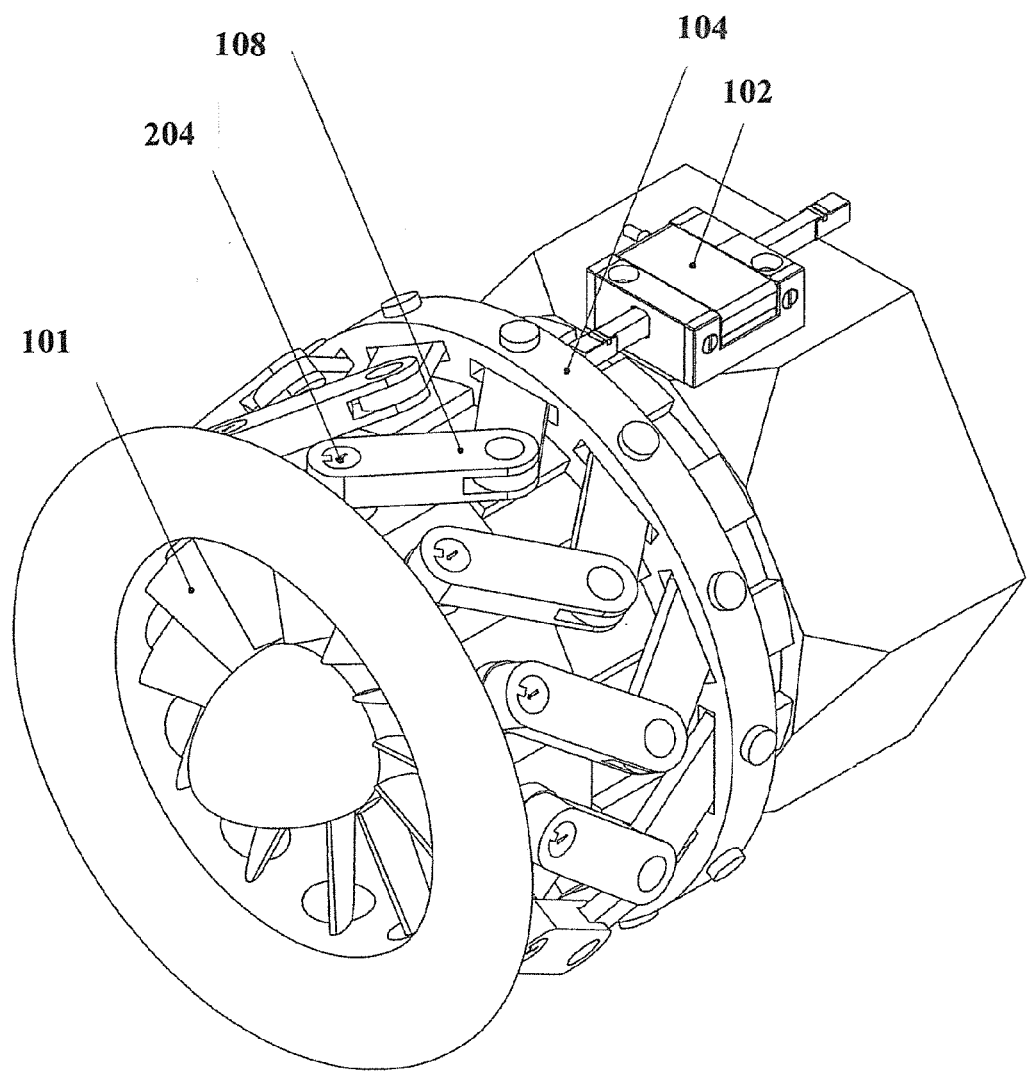
FIG. 10 depicts a top perspective view of a three dimensionally rendered embodiment of the present invention at approximately 100% actuation.
Figure 11:
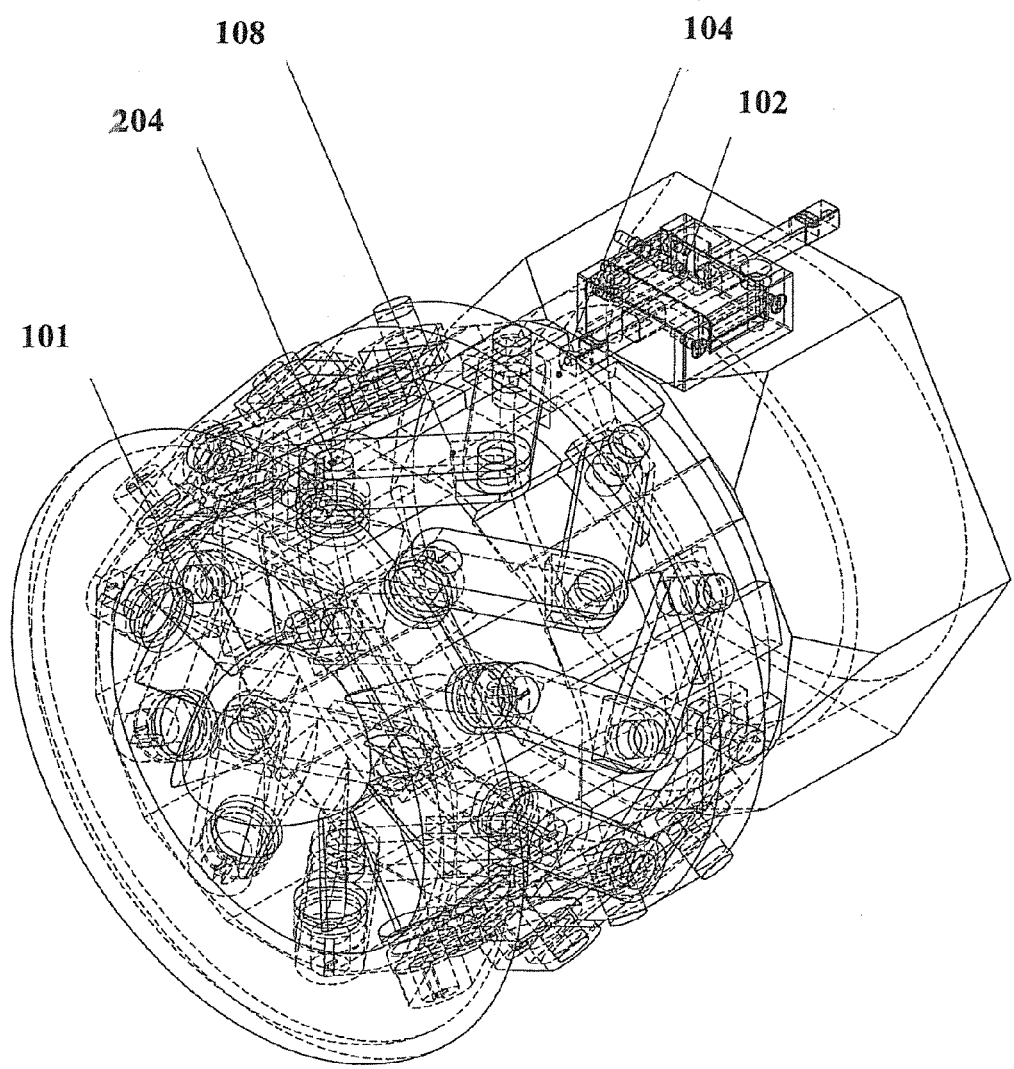
FIG. 11 depicts a top perspective view of a ghost line drawing of the present invention at approximately 100% actuation.

FIGS. 6-11 depict a preferred embodiment of a vane rotating apparatus of the invention on a turbine engine having piezoelectric inchworm-actuated IGV blades shown moving from 0% actuation in FIGS. 6 and 7, 33% actuation in FIGS. 8 and 9, and 100% actuation in FIGS. 10 and 11. It is to be noted that these figures depict only one vane rotating apparatus of the invention installed on an exemplary turbine engine; however, it is a feature of the invention that a plurality of vane rotating apparatus' of the invention may be installed on any given turbine engine as desired to effectively achieve a desired rotation of the inlet guide vanes, and that the actual number of vane rotating apparatus' of the invention of the invention that are actually used on any turbine engine is not to be considered a limitation of the present invention. For instance, one, two, three or more vane rotating apparatus of the invention may be installed on any particular turbine as may be determined by such factors as available volume, weight constraints, redundancy and fault tolerance requirements and the like. Thus one or more vane rotating apparatus of the invention 100 may be incorporated onto a turbine engine, or in any other application.

While the preferred embodiment of the invention is comprised of piezoelectric inchworm activators as described herein, the scope of the present invention also includes the use of other than piezoelectric inchworm actuators to achieve translation of the slider ring 104 including but not limited to high-displacement piezoceramic or magnetostrictive material-based stacks. Therefore the wherever the term "piezoelectric inchworm actuator" is used herein, it is understood that such term also encompasses piezoceramic, magnetostrictive and other actuators includes any other smart actuators, smart linear actuators, and linear motion control systems known within the art including but not limited to potentiometric, piezoresistive, linear non-contacting techniques and the like.

Magnetostrictive materials exhibit a change in length in the presence of a magnetic field. Cobalt is an example of a magnetostrictive material. Among alloys, the highest known magnetostriction is exhibited by Terfenol-D, (Ter for terbium, Fe for iron, NOL for Naval Ordnance Laboratory, and D for dysprosium). Terfenol-D, TbxDy1-xFe2, exhibits about 2,000 microstrains in a field of 2 kOe (160 kA/m) at room temperature and is the most commonly used engineering magnetostrictive material Another very common magnetostrictive composite is the amorphous alloy Fe81Si3.5B13.5C2 with its trade name Metglas 2605SC. Favorable properties of this material are its high saturation magnetostriction constant, of about 20 microstrains and more, coupled with a low magnetic anisotropy field strength, HA, of less than 1 kA/m (to reach magnetic saturation). Any magnetostrictive material may be used to achieve actuation in the present invention.

Referring again now to FIGS. 6 thru 11, which are perspective views showing vane rotating apparatus of the invention 100 at various levels of actuation as installed on an exemplary turbine engine, it can be seen that application of control voltages to the piezoelectric inchworm actuator 102 operates to achieve various levels of desired rotation of pivoting vanes 101. FIGS. 6 and 7 depict the vane rotating apparatus of the invention 100 at approximately 0% actuation. FIGS. 8 and 9 depict the in vane rotating apparatus of the invention 100 during actuation at approximately 33% actuation. FIGS. 10 and 11 depict the vane rotating apparatus of the invention 100 during actuation at approximately 100% actuation.

As shown in FIGS. 6-7, the vane rotating apparatus of the invention 100 may initially start in a position of approximately 0% actuation. The initial state of the system, i.e. the 0% actuation state, may be designed to position pivoting vanes 101 to any initial or nominal position as desired. In this manner it is possible to design a "failsafe" mode into the use of the invention such that the vanes will position themselves to a nominal position when there is no control voltage applied, such as could occur in the event control 501 were to experience failure during operation.

It is further to be noted that slider ring 104 may take any shape as desired, and need not necessarily be a continuous ring as depicted in the figures. Guide rail grooves 105 may include but are not limited to rails, grooves, channels, linear bearings and any other structure or cross section known in the art to enable rectilinear translation, with which a surface of slider ring 104 may slidingly engage to enable slider ring 104 to translate longitudinally when acted upon by piezoelectric actuator shaft 103. Such equivalent structures are included within the scope of the present invention.

Accordingly, then, in a preferred embodiment, piezoelectric actuator shaft 103 acts on slider ring 104; which acts on the crank slider mechanism 106; which rotates pivoting vane 101 as needed to adjust and optimize the angle of attack of pivoting vane 101 in relation to the direction of the fluid flow as desired. In a preferred embodiment, pivoting vane 101 may be set to an angle of attack corresponding to a null aerodynamic moment in a turbine engine. It is possible to set the design of the inlet guide vane pivoting system of the invention 100 to be limited as to the maximum amount of rotation of pivoting vane 101. Such a system is depicted in the examples of FIG. 9-11, in which one or more inlet guide vane pivoting system of the invention 100 are shown as capable of rotating each of the pivoting vanes 10 by a maximum angle of approximately 10 degrees for the example shown in the figures. Thus, a maximum angle of rotation may be set to any desired angle desired. The degree of rotation of the vanes is not to be considered a limitation of the present invention.

In use, it should be noted that piezoelectric inchworm actuators 102 of the preferred embodiment should be preferably placed in a location where their maximum temperature does not exceed the Curie temperature or Curie point of the piezoelectric/piezoceramic material.

The preferred application for the systems and methods of the present invention may include small-scale jet-engine CSV or IGV actuation. However, the spirit and gist of the present inventive systems and methods disclosed herein may be applied to a wide variety of other arts and technologies including but not limited to small wind-turbine blade-pitch control and the like, which includes virtually any turbine engine application in which it is desired to pivot inlet guide vanes or stator vanes.

While the above description contains much specificity, these should not be construed as limitations on the scope of any embodiment, but as exemplifications of the presently preferred embodiments thereof. Many other ramifications and variations are possible within the teachings of the various embodiments. Thus the scope of the invention should be determined by the appended claims and their legal equivalents, and not by the specific examples provided.

What is claimed is:

1. An apparatus for rotating fluid controlling vanes in a turbine engine Having a longitudinal axis, comprising:
    at least one actuator;

a slider ring further comprising at least one slider ring guide which is adapted to be slidingly engaged with at least one guide rail groove in a first supporting structure said at least one slider ring guide running in a direction along said longitudinal axis, such that the slinding engagement of said at least one guide rail groove with said at least one slider ring guide constrains said slider ring to translate only along said longitudinal axis;

at least one crank slider mechanism which is further comprised of a first arm having a proximal end and a distal end and a second arm having a proximal end and a distal end, wherein said first arm proximal end is rotatably attached to said slider ring, and wherein said first arm distal end is rotatably attached to said second arm proximal end, and wherein said second arm distal end is attached to a fluid controlling vane;

wherein said fluid controlling vane comprises an inner mounting point and an outer mounting point, wherein said inner mounting point is rotatably attachable to a second supporting structure and wherein said outer mounting point is rotatably attachable to a third supporting structure such that said fluid controlling vane is able to rotate about an axis while held in a fixed position;

whereby operation of said at least one actuator causes translation of said slider ring along said longitudinal axis and further causes articulation of said at least one crank slider mechanism, and further causes rotation of said fluid controlling vane.

2. The apparatus of claim 1 further comprising an actuator controller in electrical communication with said actuator, wherein said actuator controller is adapted to provide control voltages to said actuator, and wherein application of said control voltages to said actuator causes actuation of said actuator.

3. The apparatus of claim 1, wherein said rotatable attachment between said first arm proximal end and said slider ring is provided by a first pin, and wherein said rotatable attachment between said first arm distal end and said second arm proximal end is provided by a second pin.

4. The apparatus of claim 3 further comprising an actuator controller in electrical communication with said actuator, wherein said actuator controller is adapted to provide control voltages to said actuator, and wherein application of said control voltages to said actuator causes actuation of said actuator.

5. The apparatus of claim 1 wherein said fluid controlling vane is further defined as being selected from the group consisting of a turbine engine inlet guide vane and a turbine engine compressor stator vane.

6. The apparatus of claim 2 wherein said fluid controlling vane is further defined as being selected from the group consisting of a turbine engine inlet guide vane and a turbine engine compressor stator vane.

7. The apparatus of claim 3 wherein said fluid controlling vane is further defined as being selected from the group consisting of a turbine engine inlet guide vane and a turbine engine compressor stator vane.

8. The apparatus of claim 4 wherein said fluid controlling vane is further defined as being selected from the group consisting of a turbine engine inlet guide vane and a turbine engine compressor stator vane.

9. The apparatus of claim 1 wherein said actuator is selected from the group consisting of a piezoelectric actuator, a piezoceramic actuator and a magnetostrictive actuator.

10. The apparatus of claim 2 wherein said actuator is selected from the group consisting of a piezoelectric actuator, a piezoceramic actuator and a magnetostrictive actuator.

11. The apparatus of claim 3 wherein said actuator is selected from the group consisting of a piezoelectric actuator, a piezoceramic actuator and a magnetostrictive actuator.

12. The apparatus of claim 4 wherein said actuator is selected from the group consisting of a piezoelectric actuator, a piezoceramic actuator and a magnetostrictive actuator.

13. The apparatus of claim 5 wherein said actuator is selected from the group consisting of a piezoelectric actuator, a piezoceramic actuator and a magnetostrictive actuator.

14. The apparatus of claim 6 wherein said actuator is selected from the group consisting of a piezoelectric actuator, a piezoceramic actuator and a magnetostrictive actuator.

15. The apparatus of claim 7 wherein said actuator is selected from the group consisting of a piezoelectric actuator, a piezoceramic actuator and a magnetostrictive actuator.

16. The apparatus of claim 8 wherein said actuator is selected from the group consisting of a piezoelectric actuator, a piezoceramic actuator and a magnetostrictive actuator.

17. An apparatus for rotating fluid controlling vanes in a turbine engine, comprising:

a turbine engine having a first supporting structure, a second supporting structure and a third supporting structure, at least one fluid controlling vane, and wherein said turbine engine has a longitudinal axis;

at least one actuator selected from the group consisting of a piezoelectric inchworm actuator and a magnetostrictive actuator;

a slider ring further comprising at least one slider ring guide which is adapted to be slidingly engaged with at least one guide rail groove in said first supporting structure of said turbine engine, said groove constraining said slider ring to translate along only said longitudinal axis;

at least one crank slider mechanism which is further comprised of a first arm having a proximal end and a distal end and a second arm having a proximal end and a distal end, wherein said first arm proximal end is rotatably attached to said slider ring, and wherein said first arm distal end is rotatably attached to said second arm proximal end, and wherein said second arm distal end is attached to said fluid controlling vane;

wherein said fluid controlling vane comprises an inner mounting point and an outer mounting point, wherein said inner mounting point is rotatably attachable to said second supporting structure of said turbine engine and wherein said outer mounting point is rotatably attachable to said third supporting structure of said turbine engine such that said fluid controlling vane is able to rotate about an axis while held in a fixed position; and wherein said fluid controlling vane is selected from the group consisting of an inlet guide vane and a compressor stator vane;

whereby operation of said at least one actuator causes translation of said slider ring along said longitudinal axis and further causes articulation of said at least one crank slider mechanism and further causes rotation of said fluid controlling vane about said axis.

18. The apparatus of claim 17 further comprising an actuator controller in electrical communication with said at least one actuator, wherein said at least one actuator controller is adapted to provide control voltages to said at least one actuator, and wherein application of said control voltages to said at least one actuator causes actuation of said at least one actuator.

19. A method for rotating vanes in a turbine engine comprising:

Providing at least one actuator selected from group consisting of a piezoelectric inchworm actuator and a magnetostrictive actuator;

Providing a first supporting structure comprising at least one guide rail groove running along a longitudinal axis of said turbine engine, said at least one guide rail groove in a sliding engagement between said at least one guide disposed on said slider ring, said sliding engagement between said at least one guide rail groove and said at least one guide constraining translation of said slider ring to occur only along said longitudinal axis;

Mechanically linking said at least one actuator to a slider ring;

Mechanically linking said slider ring to at least one crank slider mechanism such that actuation of said at least one actuator causes translation of said slider ring along said longitudinal axis of the turbine engine, and further causes operation of said at least one crank slider mechanism;

Attaching said at least one crank slider mechanism to at least one vane such that operation of said at least one crank slider mechanism rotates said at least one vane; and Providing a control voltage to said at least one actuator, wherein said control voltage causes actuation of said at least one actuator, which causes translation of said slider ring and causes operation of said at least one crank slider mechanism and rotating of said at least one vane.

20. The method of claim 19 wherein said at least one vane is selected from the group consisting of an inlet guide vane of a turbine engine and a compressor stator vane of a turbine engine.

* * * * *